(12) United States Patent (10) Patent No.: US 8,667,077 B2
Kobayashi (45) Date of Patent: Mar. 4, 2014

(54) TRANSMISSION DEVICE AND METHOD OF CONTROLLING SELECTION OF RECEIVED DATA

(75) Inventor: Masato Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 603 days.

(21) Appl. No.: 12/872,067

(22) Filed: Aug. 31, 2010

(65) Prior Publication Data

US 2011/0055423 A1 Mar. 3, 2011

(30) Foreign Application Priority Data

Sep. 1, 2009 (JP) ................................ 2009-201897

(51) Int. Cl.
  *G06F 15/16* (2006.01)
(52) U.S. Cl.
  USPC .......................... 709/212; 709/213; 709/214
(58) Field of Classification Search
  None
  See application file for complete search history.

(56) References Cited

U.S. PATENT DOCUMENTS 6,385,464 B1 * 5/2002 Narita et al. ................. 455/561
6,680,905 B1 * 1/2004 Ishikawa ...................... 370/228
2006/0072923 A1 * 4/2006 Arikawa et al. .............. 398/155
2008/0297216 A1 * 12/2008 Chiang et al. ................ 327/158
2009/0103565 A1 * 4/2009 Matsui .......................... 370/470
2010/0188127 A1 * 7/2010 Cheng et al. ................. 327/237

FOREIGN PATENT DOCUMENTS

JP 2002-232380 A 8/2002
JP 2003-333007 A 11/2003

OTHER PUBLICATIONS

Huang, Sheng et al., "Survivable Differential Aware Multi-Service Over SONET/SDH Networks with Virtual Concatenation," Optical Fiber Communication and the National Fiber Optic Engineers Conference, 2007, pp. 1-3.

* cited by examiner

*Primary Examiner* — Djenane Bayard
(74) *Attorney, Agent, or Firm* — Fujitsu Patent Center

(57) ABSTRACT

A transmission device includes: a first interface unit to receive data of a plurality of first paths transmitted corresponding to a first data stream and outputting the data per path; a second interface unit to receive data of a plurality of second paths transmitted corresponding to the first data stream and outputting the data per path; a switch unit to input the data which has been output from the first and second interface unit and select and output the data from the first interface unit or the data from the second interface unit per path; a phase detection unit to detect and output a phase difference among the paths of the data which has been output from the switch unit per path; and a control unit to control the switch unit on the basis of the detected phase difference.

4 Claims, 14 Drawing Sheets

FIG. 5

| Use of bits 1 to 4 | H4 bits | | | | | | | | MFI1 |
|---|---|---|---|---|---|---|---|---|---|
| | bit1 | bit2 | bit3 | bit4 | bit5 | bit6 | bit7 | bit8 | Frame No. |
| MFI2 MSB | b1 | b2 | b3 | b4 | 0 | 0 | 0 | 0 | 0 |
| MFI2 LSB | b5 | b6 | b7 | b8 | 0 | 0 | 0 | 1 | 1 |
| CTRL | x | x | x | x | 0 | 0 | 1 | 0 | 2 |
| GID | 0 | 0 | 0 | 0 | 0 | 0 | 1 | 1 | 3 |
| Reserved | 0 | 0 | 0 | 0 | 0 | 1 | 0 | 0 | 4 |
| Reserved | 0 | 0 | 0 | 0 | 0 | 1 | 0 | 1 | 5 |
| CRC-8 MSB | c1 | c2 | c3 | c4 | 0 | 1 | 1 | 0 | 6 |
| CRC-8 LSB | c5 | c6 | c7 | c8 | 0 | 1 | 1 | 1 | 7 |
| Member Status | x | x | x | x | 1 | 0 | 0 | 0 | 8 |
| Member Status | x | x | x | x | 1 | 0 | 0 | 1 | 9 |
| RS-ACK | 0 | 0 | 0 | 0 | 1 | 0 | 1 | 0 | 10 |
| Reserved | 0 | 0 | 0 | 0 | 1 | 0 | 1 | 1 | 11 |
| Reserved | 0 | 0 | 0 | 0 | 1 | 1 | 0 | 0 | 12 |
| Reserved | 0 | 0 | 0 | 0 | 1 | 1 | 0 | 1 | 13 |
| SQ MSB | b1 | b2 | b3 | b4 | 1 | 1 | 1 | 0 | 14 |
| SQ LSB | b5 | b6 | b7 | b8 | 1 | 1 | 1 | 1 | 15 |

MFI1=bit 5 to 8
Multi Frame No. = MFI2(8bit) & MFI1(4bit)

FIG. 7

| PRIORITY | | STATE OF PROTECTION SWITCH | POSSIBILITY TO CHANGE FOR DELAY ADJUSTMENT | REMARKS |
|---|---|---|---|---|
| HIGH | | BEING FORCIBLY CHANGED (SELECTION SYSTEM IS BEING FIXED) | NO | |
| ↓ | | BEING CHANGED FOR SIGNAL DISCONNECTION | NO | |
| | | BEING CHANGED FOR SIGNAL DEGRADATION | NO/YES | YES: DEPENDING ON OPERATIONAL POLICY |
| LOW | | NORMAL STATE | YES | |

FIG. 12

| Use of bits 1 to 4 | bit1 | bit2 | bit3 | bit4 | bit5 | bit6 | bit7 | bit8 | MFI1 |
|---|---|---|---|---|---|---|---|---|---|
| Reserved | Request | DIR | 0 | ACK | 1 | 0 | 1 | 1 | Frame No. |
| | | | | | | | | | 11 |

H4 bits

Request 1: Request
0: IDLE

DIR 1: DELAY TO BE DECREASED
0: DELAY TO BE INCREASED

ACK 1: ACK
0: No-ACK

TRANSMISSION DEVICE AND METHOD OF CONTROLLING SELECTION OF RECEIVED DATA

CROSS-REFERENCE TO RELATED APPLICATIONS

This application is based upon and claims the benefit of priority from the prior Japanese Patent Application No. 2009-201897 filed on Sep. 1, 2009, the entire contents of which are incorporated herein by reference.

FIELD

The embodiments discussed herein are related to a transmission device and a method of controlling selection of received data.

BACKGROUND

Recently, Ethernet-based services have been more frequently utilized owing to the explosive spread of communications over the Internet or the like. The provision of services in the widest possible range and at the lowest possible cost may be important for dealers of communication services. In general, the dealers of communication services construct their systems by utilizing existing network equipment as effectively as possible. Under the above mentioned circumstances, data is transmitted by utilizing the transmission network of highly reliable Synchronous Optical Networking/Synchronous Digital Hierarchy (SONET/SDH) which has been constructed so far so as to cover a wider area.

A system of transmitting Ethernet-based packet data over the SONET/SDH transmission network is widely used as the Ethernet over SONET/SDH system and the VCAT (Virtual Concatenation) is generally used as a mapping system thereof (by way of example, a technique disclosed in Japanese Laid-open Patent Publication No. 2002-232380 is given). In addition, in the SONET/SDH system, a redundancy configuration including a current-use system (a work system) and a spar system (a protect system) is adopted in order to avoid interruption of a service caused by occurrence of a fault.

FIG. 1 is a diagram illustrating an example of a configuration of an existing device that transmits packet data from a client over the SONET/SDH transmission network. In the device illustrated in FIG. 1, UPSR (Uni-directional Path Switched Ring) is thought to be used as a protection function. Incidentally, in FIG. 1, although only the configurations of a source transmission device 1000 and a sink transmission device 2000 with SONET/SDH transmission networks interposed between them are illustrated, in a typical transmission device, both the source and sink configurations are included in one transmission device.

In the example illustrated in FIG. 1, in the source transmission device 1000, a client data receiving unit 111 receives packet data from a client. An SDH mapping unit 112 maps the received packet data on a concatenation group and divides the data into "n" paths. Then, a protection switch unit 113 distributes the data of the respective paths to two systems of the work system and the protect system using a distributor unit. The data so distributed is multiplexed using an interface unit 114 and is transmitted to a SONET/SDH transmission network of the work system and a SONET/SDH transmission network of the protect system.

On the other hand, in the sink transmission device 2000, an interface unit 121 receives the data from the SONET/SDH transmission network of the work system and the data from the SONET/SDH transmission network of the protect system and restores the multiplexed data respectively sent over the network of the work system and the network of the protect system into the data which is divided into the respective paths. Then, a protection switch unit 122 selects a path of the work system or the protect system using a selector unit. Next, an SDH demapping unit 123 stores the data on the respective paths into a differential delay memory unit 124, by taking correspondence of the data with the concatenation group into consideration. Then, a client data sending unit 125 regenerates the packet data by reading the data out of the differential delay memory unit 124 at the speed of the client on the sink side and sends the data to the client.

Incidentally, the differential delay memory unit 124 is provided for reasons as follows. That is, in the VCAT, unlike general continuous concatenation, main signal data is transmitted by dividing it to respective paths which configure a concatenation group and each path is handled as a discrete path on the SONET/SDH transmission network, so that it may not be guaranteed that the respective paths are transmitted along the same route and hence it may sometimes occur that a difference (differential delay) is generated in transmission delay time among the respective paths because the respective paths are transmitted along different routes. The differential delay memory unit 124 performs buffering (to temporarily store data in a buffer) on the data of the respective paths which configure the same concatenation group to wait for data from the path which comes late, thereby reassembling the packet data. The differential delay which may be absorbed is determined depending on the size of the differential delay memory unit 124 and a network may be limited by the size of the differential delay memory unit 124. In the case that the differential delay of the amount that the differential delay memory unit 124 may leave unabsorbed has generated among the respective paths, the signal in the concatenation group concerned may not be reassembled and hence the signal may not traffic.

SUMMARY

According to an aspect of the invention, a transmission device including: a first interface unit to receive data of a plurality of first paths which have been transmitted corresponding to a first data stream and outputting the data per path; a second interface unit to receive data of a plurality of second paths which have been transmitted corresponding to the first data stream and outputting the data per path; a switch unit to input the data which has been output from the first interface unit and the data which has been output from the second interface unit and select and output the data from the first interface unit or the data from the second interface unit per path; a phase detection unit to detect and output a phase difference among the paths of the data which has been output from the switch unit per path; and a control unit to control the switch unit on the basis of the detected phase difference.

The object and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 5 is a diagram illustrating an example of H4 Byte information in a POH;

FIG. 7 is a diagram illustrating an example of judgment as to priority for switching;

FIG. 12 is a diagram illustrating an example of assignment of a switch request to H4 Byte information performed so as to cope with an interconnected ring configuration;

DESCRIPTION OF EMBODIMENT(S)

In the case that transmission data such as packet data or the like is to be transmitted over a SONET/SDH transmission network using a VCAT, a differential delay in time among paths may be a problem. In particular, as one of the main factors that may induce a differential delay among paths in the case that a redundancy configuration is adopted, a difference in route along which data is transmitted caused by a difference in route which is selected using each switch may be given. Therefore, in an existing transmission device, in the case that a network transmission line has a redundancy configuration that is to be configured, it is desirable to configure the network such that the size of data concerned may not exceed the size of a differential delay memory in a combination of routes selected using respective switches with which the differential delay among paths may become the largest.

Figure 1:
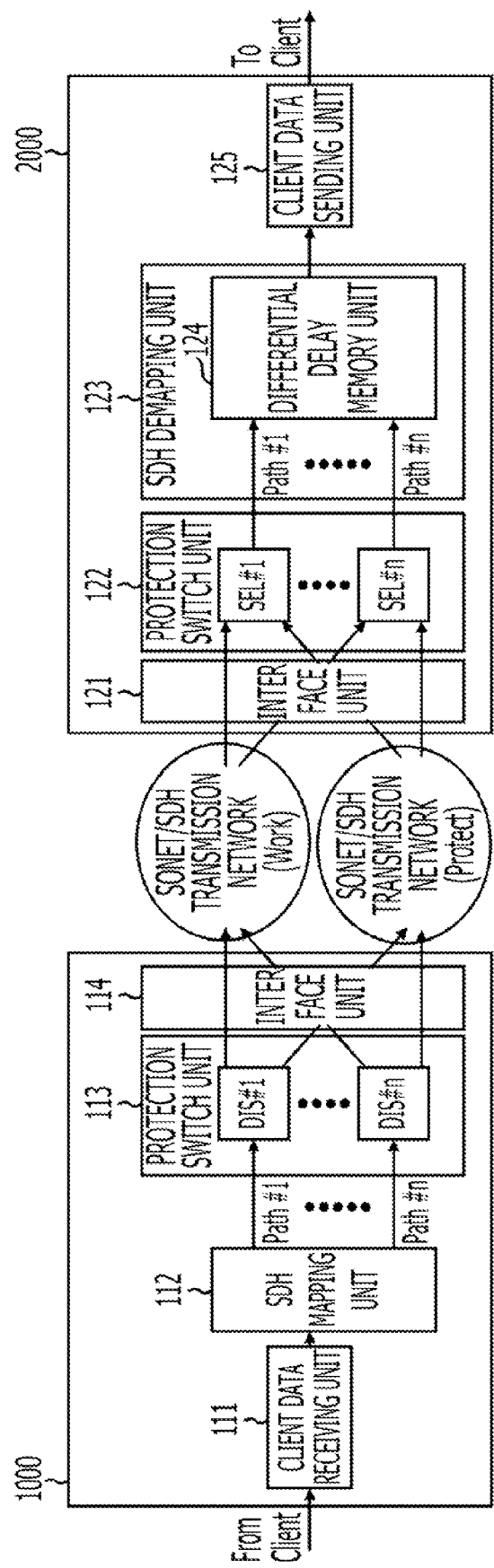
FIG. 1 is a diagram illustrating an example of a configuration of an existing transmission device of the type that transmits packet data of a client over a SONET/SDH transmission network.
Figure 2:
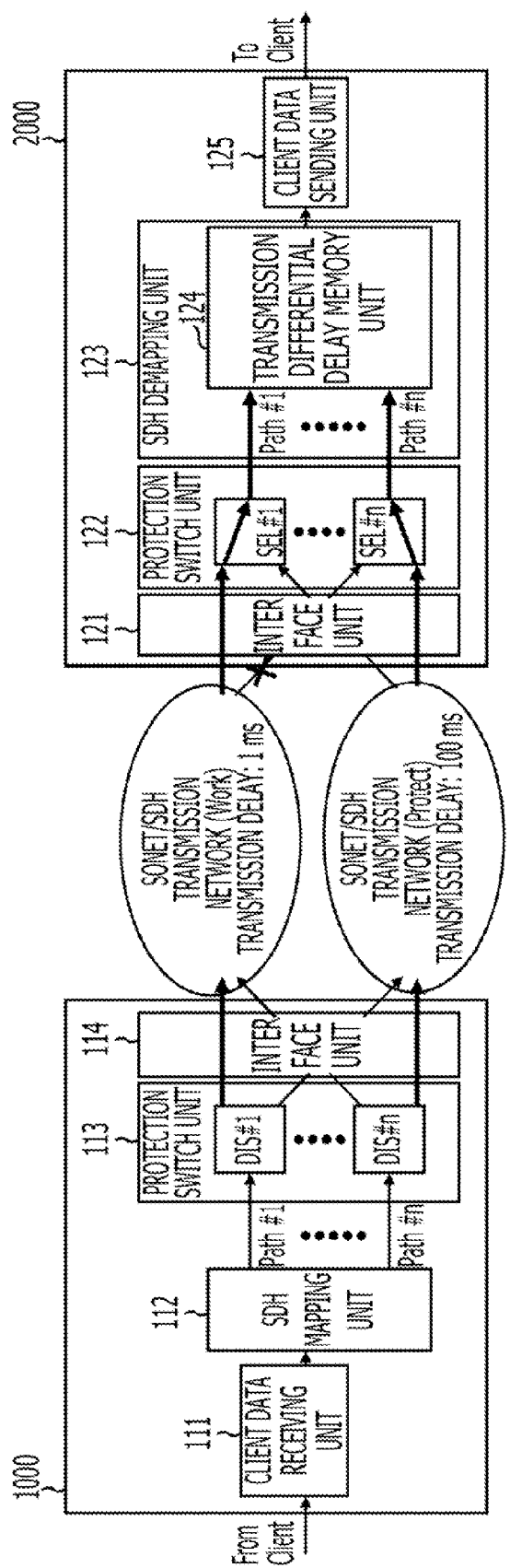
FIG. 2 is a diagram illustrating an example in which a differential delay is increased by path switching.

FIG. 2 is a diagram illustrating an example in which the differential delay is increased by path switching, that is, an example of a network in which a SONET/SDH transmission network of the work system has a transmission delay of about 1 ms and a SONET/SDH transmission network of the protect system has a transmission relay of about 100 ms. The example illustrated in FIG. 2 corresponds to a case in which attention is paid to a transmission device NE (Network Element) #1 and a transmission device NE #6 in a UPSR ring illustrated in FIG. 3, a route #1 which is adjacent to the above mentioned devices is a work system and a route #2 which passes other transmission devices is a protect system.

In the example illustrated in FIG. 2, in the case that all paths #1 to #n which configure a concatenation group use the SONET/SDH transmission network of the work system as a transmission route, almost no differential delay may generate among the paths. However, in the case that route switching has generated on one path (Path #n) for some reason, it may become necessary for the differential delay memory 124 to absorb a differential delay of 100 ms and hence a memory size of 1 gigabyte (Gb) is desirable for a concatenation group of 10 gigabits per second (Gbps) in size in order to absorb the differential delay of 100 ms.

In addition, it is desirable to pay attention to a change in delay time in the case that the number of relay devices or the like is to be increased or the relay devices are to be updated after transmission devices have been installed. In the case that alteration by which a transmission delay of the protect system may be increased is performed with no intention, it may sometimes occur that data does not traffic when redundancy switching (using a protection switch) has been performed.

As described above, it is desirable to mount a memory of the size which is enough to absorb the differential delay in time under the worst conditions that a route along which the differential delay in time is the longest has been selected in a transmission device that adopts the VCAT. However, in order to cope with the transmission size of a main signal, a high-speed and large-size memory is desirable, which may not be ignored from the viewpoints of cost reduction, power saving and physical size reduction. If all of the paths configuring one concatenation group are typically mapped on the same transmission route, almost no differential delay will be generated. Therefore, the above mentioned problem may be eliminated. However, utilization efficiency of the line may be restricted in compensation for the path mapping. As described above, the above mentioned problems may restrict designs of a transmission device and a network.

The first embodiment is described below.

Figure 3:
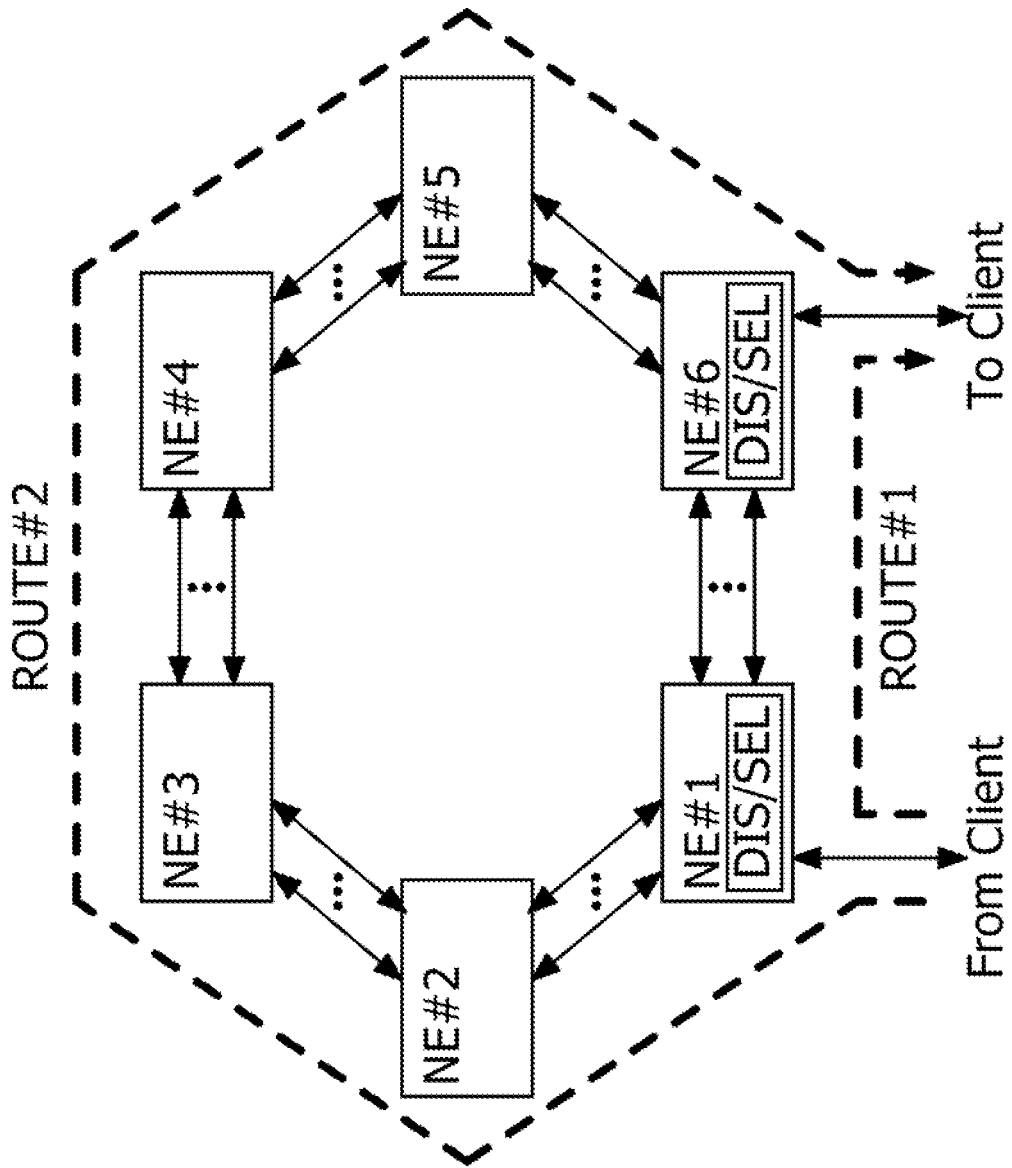
FIG. 3 is a diagram illustrating an example of an SONET/SDH UPSR ring.
Figure 4:
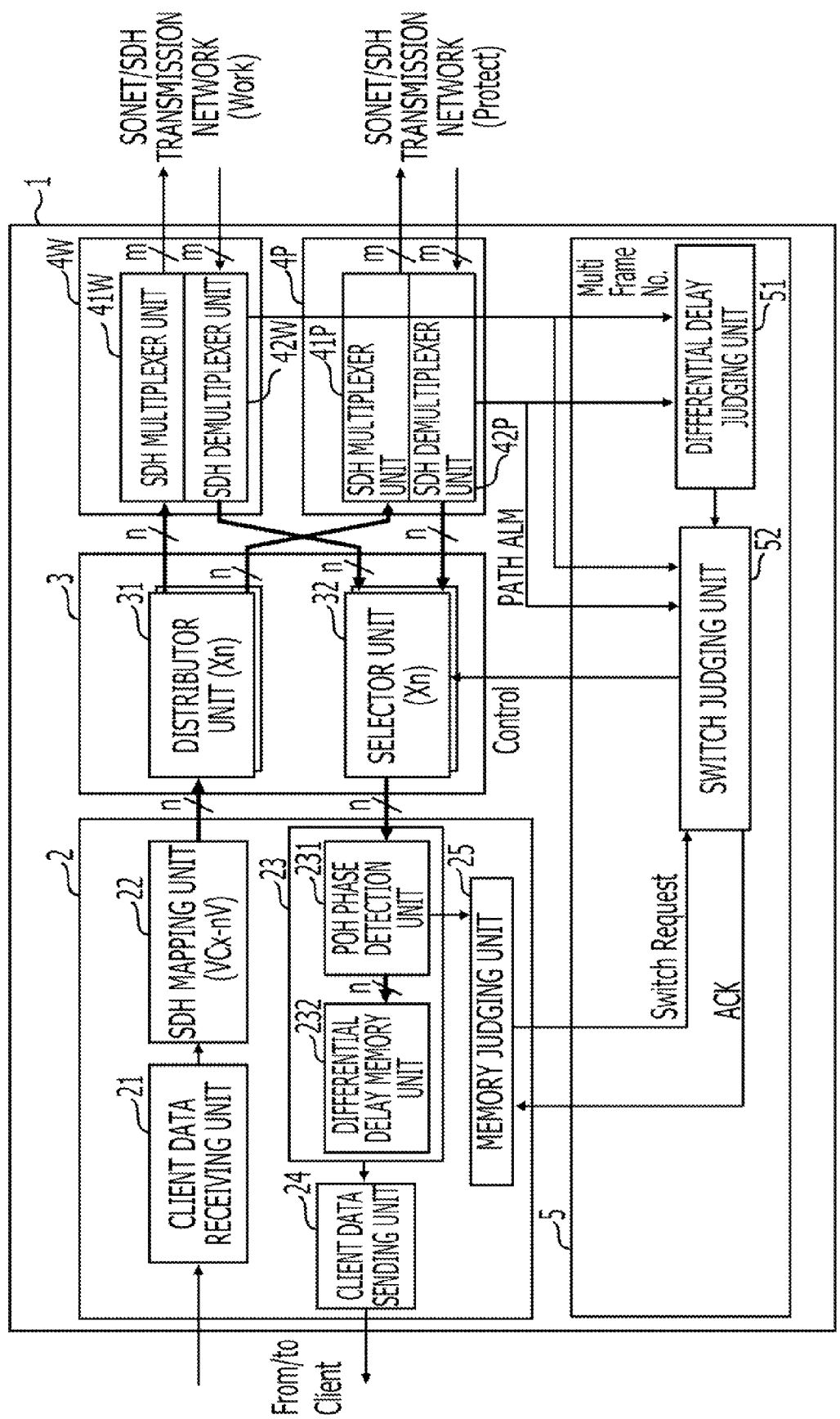
FIG. 4 is a diagram illustrating an example of a configuration of a transmission device according to a first embodiment.

FIG. 4 is a diagram illustrating an example of a configuration of a transmission device according to a first embodiment. As a network configuration thereof, a UPSR ring as illustrated in FIG. 3 may be used.

In FIG. 4, a transmission device 1 includes a client interface unit 2, a protection switch unit 3, interface units 4W, 4P and a switch control unit 5. The client interface unit 2 sends packet data (a data stream) received over Ethernet or the like to a client (not illustrated) and receives data from the client and inputs data of "n" paths which configure a concatenation group from the protection switch unit 3 and outputs data to the protection switch unit 3. The protection switch unit 3 distributes the data of the "n" paths which have been input from the client interface unit 2 to a work system and a protect system and outputs the data to the interface units 4W and 4P, and selects the data of the work system or the protect system, that is, the data of "n" paths input from the interface unit 4W or 4P per path and outputs the selected data to the client interface unit 2. The interface units 4W and 4P send SDH frames respectively to the SONET/SDH transmission networks of the work system and the protect system and receive the frames from these networks, multiplex the data of "n" paths which have been input from the protection switch unit 3 to generate 1 to m SDH frames and output the generated frames to the SONET/SDH transmission networks, restore (de-multiplex) the SDH frames input from the SONET/SDH transmission networks and output data obtained by demultiplexing to the protection switch unit 3. The switch control unit 5 controls the protection switch 3 on the basis of a path alarm (PATH ALM) or the like detected using the interface units 4W and 4P.

The client interface unit 2 includes a client data receiving unit 21, an SDH mapping unit 22, an SDH demapping unit 23, a client data sending unit 24 and a memory judging unit 25. The client data receiving unit 21 receives, for example, packet data from the client and outputs the data to the SDH mapping unit 22. The SDH mapping unit 22 maps the packet data received from the client data receiving unit 21 on a concatenation group (VCx-nV) of the VCAT to divide the data into "n" paths (VCx). The SDH demapping unit 23 reassembles the data of "n" paths (VCx) input from the protection switch unit 3 in accordance with their correspondence with the concatenation group (VCx-nV).

The SDH demapping unit 23 includes a Path Over Head (POH) phase detection unit 231 and a differential delay memory unit 232. The POH phase detection unit 231 detects the phase of the data of each path from a timing at which the multi frame number of the POH of the data of each of "n" paths (VCx) input from the protection switch unit 3 changes.

FIG. 5 is a diagram illustrating an example of H4 Byte information in the POH, in which 12 bits obtained by synthesizing 4-bit MFI1 (bit5 to bit8 in H4 bits) with 8-bit MFI2 (bit1 to bit4 when MFI1=0 and bit1 to bit4 when MFI1=1) constitute each multi frame number.

Returning to the example illustrated in FIG. 4, the differential delay memory unit 232 performs buffering on the data of "n" paths (VCx) which have been input from the protection switch unit 3 via the POH phase detection unit 231 in accordance with the order in which each piece of data corresponds to each part of the concatenation group (VCx-nV) to absorb the differential delay of each path.

The client data sending unit 24 awaits arrival of the data of each path using the differential delay memory 232 of the SDH demapping unit 23 to put the respective paths in phase with one another, reads out the data at a speed that the data is sent to the client and sends regenerated packet data to the client. The memory judging unit 25 judges whether there exists a path having the differential delay that the differential delay memory unit 232 leaves unabsorbed from a result of phase detection performed using the POH phase detection unit 231 of the SDH demapping unit 23 and outputs a switch request (Switch Request) to the switch control unit 5 on the basis of a result of judgment. The memory judging unit 25 judges above mentioned judgement based on comparing the phase difference with a threshold value.

The protection switch unit 3 includes a distributor unit 31 and a selector unit 32. The distributor unit 31 distributes the data of "n" paths (VCx) input from the client interface unit 2 to the work system and the protect system and outputs the data to the interface units 4W and 4P. The selector unit 32 selects the data of "n" paths (VCx) input from the interface unit 4W or the data of "n" paths (VCx) input from the interface unit 4P per path under the control of the switch control unit 5 and outputs the selected data to the client interface unit 2.

The interface unit 4W includes an SDH multiplexer unit 41W and an SDH demultiplexer unit 42W. The SDH multiplexer unit 41W multiplexes the data of "n" paths (VCx) input from the distributor unit 31 of the protection switch unit 3 to generate 1 to m SDH frames and sends the generated frames to the SONET/SDH transmission network of the work system. The SDH demultiplexer unit 42W demultiplexes 1 to m SDH frames input from the SONET/SDH transmission network of the work system to the data of "n" paths (VCx) and outputs the data to the selector unit 32 of the protection switch 3.

The interface unit 4P includes an SDH multiplexer unit 41P and an SDH demultiplexer unit 42P. The SDH multiplexer unit 41P multiplexes the data of "n" paths (VCx) input from the distributor unit 31 of the protection switch unit 3 and sends the multiplexed data to the SONET/SDH transmission network of the protect system. The SDH demultiplexer 42P demultiplexes the data input from the SONET/SDH transmission network of the protect system to the data of "n" paths (VCx) and outputs the data to the selector unit 32 of the protection switch unit 3.

The switch control unit 5 includes a differential delay judging unit 51 and a switch judging unit 52. The differential delay judging unit 51 acquires the multi frame numbers (FIG. 5) from the SDH demultiplexer unit 42W of the interface unit 4W and the SDH demultiplexer unit 42P of the interface unit 4P. Then, the differential delay judging unit 51 judges the phase of which data comes first depending on the multi frame number of which system, the work system or the protect system, changes first on respective paths which correspond to each other and outputs a result of judgment to the switch judging unit 52. Incidentally, the memory judging unit 25 of the client interface unit 2 uses the phase of the data of each path of the system which has been selected using the protection switch unit 3 as an object to be monitored, while the differential delay judging unit 51 uses the phases of the data of the respective paths of the work and protect systems before the data of one of the systems is selected using the protection switch unit 3 as objects to be monitored.

The switch judging unit 52 controls the protection switch unit 3 such that the switch unit 3 may be implemented as an ordinary protect switch which operates on the basis of path alarms from the interface units 4W and 4P and also controls the protection switch unit 3 in accordance with a result of the judgment performed using the differential delay judging unit 51 and the situations in which the path alarms or the like are given from the interface units 4W and 4P in response to a switch request from the memory judging unit 25 of the client interface unit 2.

Next, operations performed in the case that one of the protection switches is operated from a normal operational state and a differential delay of the amount exceeding the memory size of the differential delay memory 232 has been generated.

The memory judging unit 25 of the client interface unit 2 judges whether a differential delay of the amount exceeding the memory size of the differential delay memory 232 generates in the normal operational state. The memory judging unit 25 may perform phase judgment on the basis of two references, that is, minimum delay reference judgment (judgment in which a minimum delay is used as a reference) and maximum delay reference judgment (judgment in which a maximum delay is used as a reference). In the minimum delay reference judgment, a path which is not within a phase range which may be absorbed with the memory size of the differential delay memory unit 232 is detected on the basis of the timing of a path which is the earliest in multi-frame-number-changing timing. The path which has been detected in this judgment is judged to be decreased in delay. In the maximum delay reference judgment, a path which is not within a phase range may be absorbed with the memory size of the differential delay memory unit 232 is detected on the basis of the timing of a path which is the latest in multi-frame-number-changing timing. The path which is detected in this judgment is judged to be increased in delay.

Figure 6:
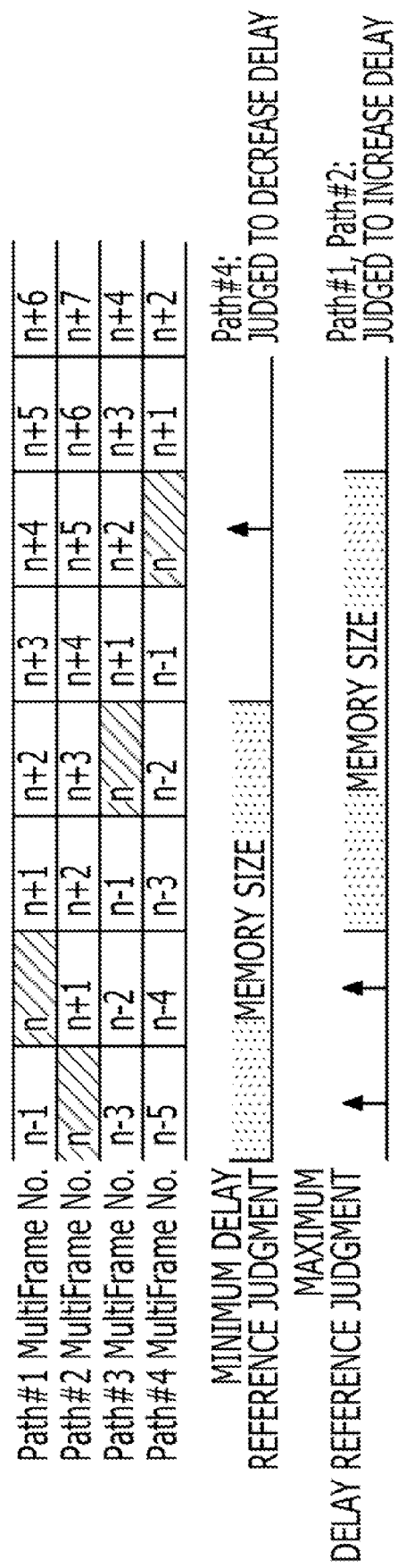
FIG. 6 is a diagram illustrating an example of judgment performed using a memory judgment unit.

FIG. 6 is a diagram illustrating an example of judgment performed using the memory judging unit. In the minimum delay reference judgment, the timing at which the multi number frame turns to "n" is monitored for each path configuring the concatenation group. In the example illustrated in FIG. 6, the paths Path#2, Path#1 and Path#3 are judged to be within the range of phases which may be absorbed with the memory size of the differential delay memory unit 232 and the path Path#4 is judged not to be within the above range of phases. Likewise, in the maximum delay reference judgment, the timing at which the multi frame number turns to "n" is monitored. In the example illustrated in FIG. 6, the paths Path#4 and Path#3 are judged to be within the range of phases which may be absorbed with the memory size of the differential delay memory unit 232 and the paths Path#1 and Path#2 are judged not to be within the above range of phases. Incidentally, although in the example illustrated in FIG. 6, phase judgment is performed on the basis of the fixed multi frame number "n", judgment need not necessarily be performed on the basis of the fixed multi frame number and judgment may be also performed on the basis of a difference in multi frame number value among the respective paths at substantially the same timing.

Returning to FIG. 4, the memory judging unit 25 of the client interface unit 2 first performs the minimum delay reference judgment or the maximum delay reference judgment, and in the case that a path which is not within the phase range which may be absorbed with the memory size of the differential delay memory unit 232 is detected, gives a switch request to the switch judging unit 52 of the switch control unit 5. The switch request includes information on the number (Switch Path No.) of a path which is not within the absorbable phase range, necessity to decrease/increase the delay and the like.

The switch judging unit 52 changes from a currently selected system (the work or protect system) to another system with respect to an object path in response to the switch request from the memory judging unit 25 to judge whether the delay is changed so as to conform to the switch request for necessity to decrease/increase the delay on the basis of the information sent from the differential delay judging unit 51.

Then, in the case it has been judged that delay changing conforming to the switch request may be realized, the switch judging unit 52 performs switching priority judgment (judgment about to which switching operation the priority is given) on the basis of the currently given path alarm and the current control state.

FIG. 7 is a diagram illustrating an example of switching priority judgment. In the example illustrated in FIG. 7, it is judged such that in the case the protection switch is in a state in which "it is being forcibly changed (the selected system is being fixed)", the possibility to change for delay adjustment is "No", in the case that the protection switch is in a state in which "it is being changed for signal disconnection", the possibility to change for delay adjustment is "No", in the case that the protection switch is in a state in which "it is being changed for signal degradation", the possibility to change for delay adjustment is "No" or "Yes" depending on setting of an operational policy, and in the case the protection switch is "in a normal state", the possibility to change for delay adjustment is "Yes" in ascending order of priority.

Returning to FIG. 4, in the case that switching (switch changing) may be possible, the switch judging unit 52 performs a switch controlling operation on the selector unit 32 of the protection switch unit 3 and returns a response (ACK) to the memory judging unit 25 of the client interface unit 2. On the other hand, in the case delay change conforming to the switch request may not be realized, the switch judging unit 52 does not perform the switch controlling operation and returns a response to the memory judging unit 25 of the client interface unit 2.

The memory judging unit 25 which has received the response from the switch judging unit 52 of the switch control unit 5 performs again the minimum delay reference judgment or the maximum delay reference judgment which has been the precondition for the switch request and judges whether the differential delay has been improved by switching.

In the case that the differential delay has not been improved, the memory judging unit 25 performs judgment which is different from the previously performed judgment (the maximum delay reference judgment when the minimum delay reference judgment has been previously performed, or the minimum delay reference judgment when the maximum delay reference judgment has been previously performed) and gives a switch request. The operations of the switch control unit 5 to be performed after the switch request has been given may be the same as the above. The differential delay is adjusted within a range in which the adjustment may be possible by combining the protection switches of the respective paths with each other on the basis of the above mentioned two judging operations. In the case that the differential delay is not improved by performing the above mentioned two judging operations, the memory judging unit 25 halts performance of a series of operations and then repeats the same operations after a predetermined time has elapsed.

Owing to the above mentioned functions, although in an existing device, the differential delay memory 232 may need to have the memory size corresponding to a maximum differential delay of a combination of the protection switches of the respective paths, the memory size may be remarkably decreased according to this embodiment. That is, in this embodiment, the differential delay memory unit 232 may need only have the memory size coping with a maximum differential delay in the cases that all the switches are selecting the work system and all the switches are selecting the protect system and the state in which the respective switches are selected is adjusted such that the maximum differential delay may be automatically set within the range of the memory size for the switching operation at least derived from a single phenomenon.

For example, as for the traffic between the transmission device NE#1 and the transmission device NE#6 in the UPSR ring (six transmission devices NE#1 to NE#6 configure the bi-directional ring) illustrated in FIG. 3, two routes, that is, the route #1 along which transmission is performed with the shortest delay and the route #2 along which transmission is performed with the longest delay are present. In an existing device, in the case that a protection switch is operated on a path configuring the concatenation group owing to disconnection of any one of fibers in the ring or a fault in a cross connect part of a delay device, the path along the route #1 and the path along the route #2 are present in a mixed state and hence data traffic of the VCAT system may not be ensured unless the memory size corresponding to the total amount of differential delays along the route #1 and the route #2 is provided. On the other hand, according to this embodiment, the state of the switch is controlled such that the differential delay among the paths may be decreased as mentioned above, so that a mixed presence of the path along the route #1 and the path along the route #2 owing to performance of the switching operation derived from one phenomenon may be avoided by providing the memory size which may cope with the cases in which data of all of the paths is transmitted along the route #1 and data of all the paths is transmitted along the route #2 and data traffic of the VCAT may be ensured.

The second embodiment is described below.

Figure 8:
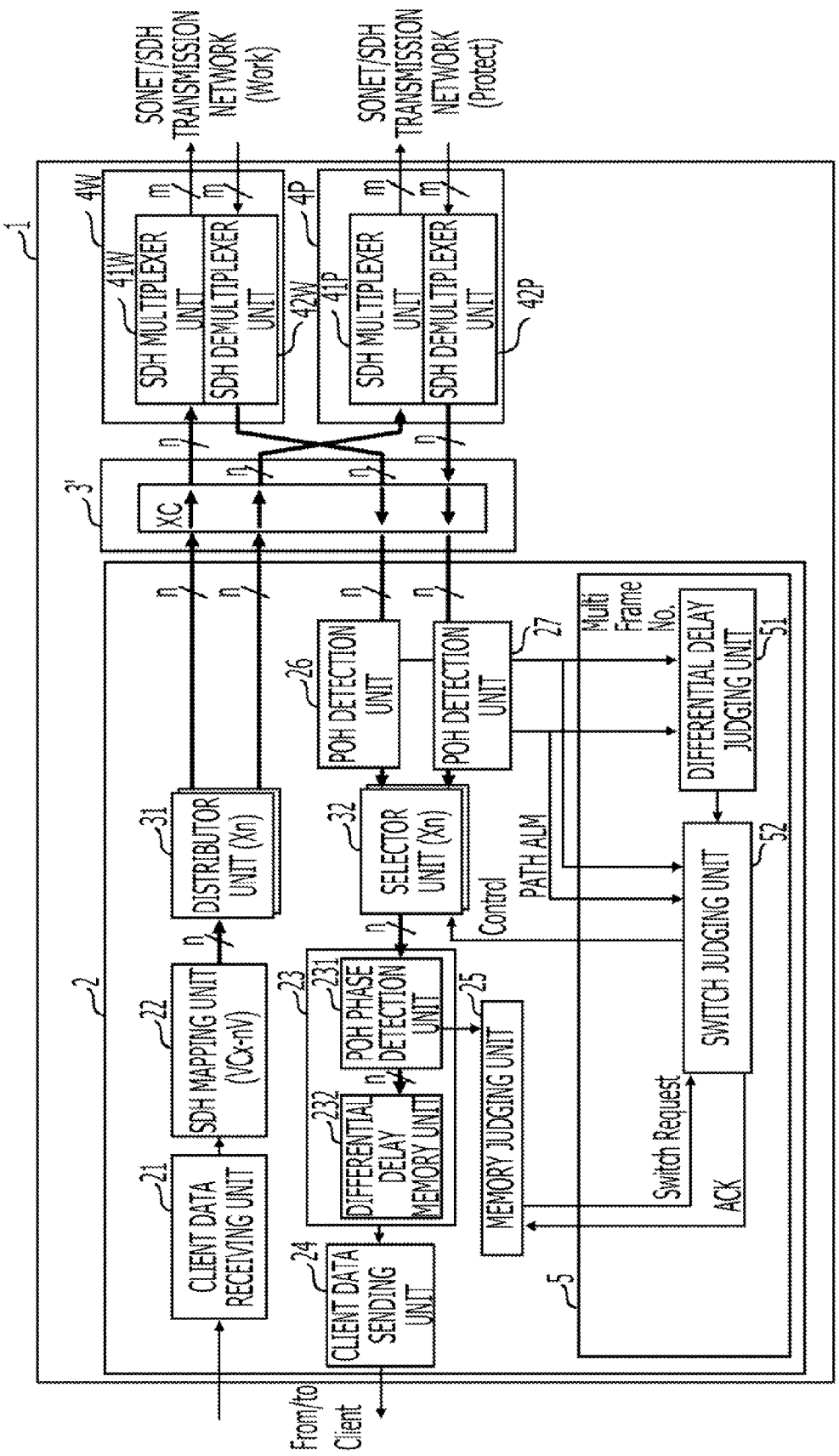
FIG. 8 is a diagram illustrating an example of a transmission device according to a second embodiment.

FIG. 8 is a diagram illustrating an example of a configuration of a transmission device according to a second embodiment. In the example, arrangement of functional units is so devised as to be readily applicable to an existing transmission device.

The configuration of the transmission device 1 illustrated in FIG. 8 differs from that of the transmission device 1 illustrated in FIG. 4 in that the distributor unit 31 and the selector unit 32 which are constitutional elements of the protection switch unit 3 and the switch control unit 5 are installed as parts of the client interface unit 2. In addition, a switch unit (a Switch Fabric) 3' that eliminates the necessity of the functions of the distributor and the selector is provided in place of the protection switch unit 3. Further, POH detection units 26 and 27 are installed at the front stage of the selector unit 32 so as to acquire the multi frame number from the POH in the client interface unit 2.

Owing to the above mentioned configuration, constitutional elements which are the same as those in an existing general transmission device are installed except the client interface unit 2. Thus, the transmission device 1 having the differential delay adjusting function may be implemented simply by combining an interface card of the client interfaced unit 2 having the differential delay adjusting function with an existing device.

The third embodiment is described below.

Figure 9:
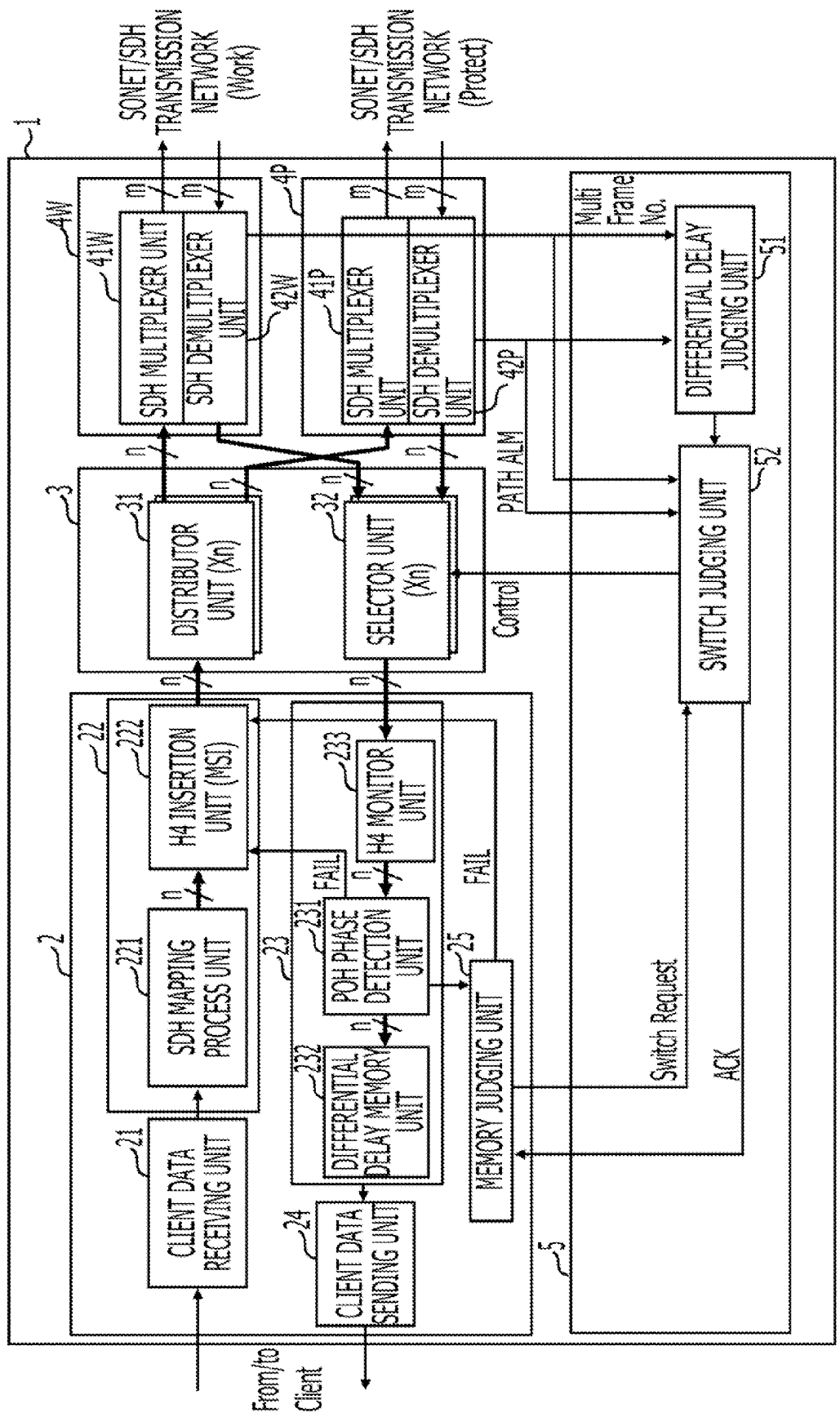
FIG. 9 is a diagram illustrating an example of a transmission device according to a third embodiment.

FIG. 9 is a diagram illustrating an example of a configuration of a transmission device according to a third embodiment. In the example illustrated in FIG. 9, an LCAS (Link Capacity Adjustment Scheme) function related to the VCAT is utilized.

The LCAS function is a function for increasing/decreasing the number of paths configuring a concatenation group in operation and includes a temporary removal function for separating a path in which a fault has occurred from the concatenation group. In general, the temporary removal function copes with only a fault in a path, and hence although it does not cope with signal interruption owing to overflow of a differential delay memory unit, in a device in which the differential delay adjusting function is mounted, a path of the differential delay of the amount which may exceed the memory size may be specified using the memory adjusting unit. Thus, signal interruption owing to overflow of the differential delay memory unit may be relieved by the temporal removal function by utilizing the differential delay adjusting function.

The configuration of the transmission device 1 illustrated in FIG. 9 differs from that of the transmission device 1 illustrated in FIG. 4 in that an H4 insertion unit 222 is provided at the rear stage of an SDH mapping process unit 221 for performing an original mapping process using the SDH mapping unit 22 and an H4 monitor unit 233 for performing the LCAS function is included in the SDH demapping unit 23. Incidentally, a description of an internal configuration for implementing the LCAS function will be omitted.

The temporal removal function is a function for performing a process of separating an object path from the concatenation group in the opposed transmission device by inserting a flag (MSI=FAIL) indicative of a fault of the object path into a Member Status field (FIG. 5) in the H4 Byte information using the H4 insertion unit 222. In general, FAIL information is generated from an alarm detected using the POH phase detection unit 231 included in the SDH demapping unit 23. In addition to the above mentioned operation, in the configuration according to this embodiment, FAIL information is generated for data of a path which has been judged to be delay-adjusted in the minimum/maximum delay reference judgment performed using the memory judging unit 25 and is used as a trigger for insertion of a flag (MSI=FAIL) which is performed using the H4 insertion unit 222.

The FAIL information is generated using the memory judging unit 25 in the case that the phase difference among the paths is not relieved after reception of the response (ACK) to the switch request which has been made on the basis of the minimum/maximum reference judgment and an object path derived from a result of judgment that the number of paths which have been judged to be delay-adjusted in the minimum or maximum delay reference judgment is smaller is judged to be "FAIL" with the FAIL information.

The fourth embodiment is described below.

Another embodiment is configured to cope with an interconnected ring configuration having a plurality of protection switches in a transmission line.

Figure 10:
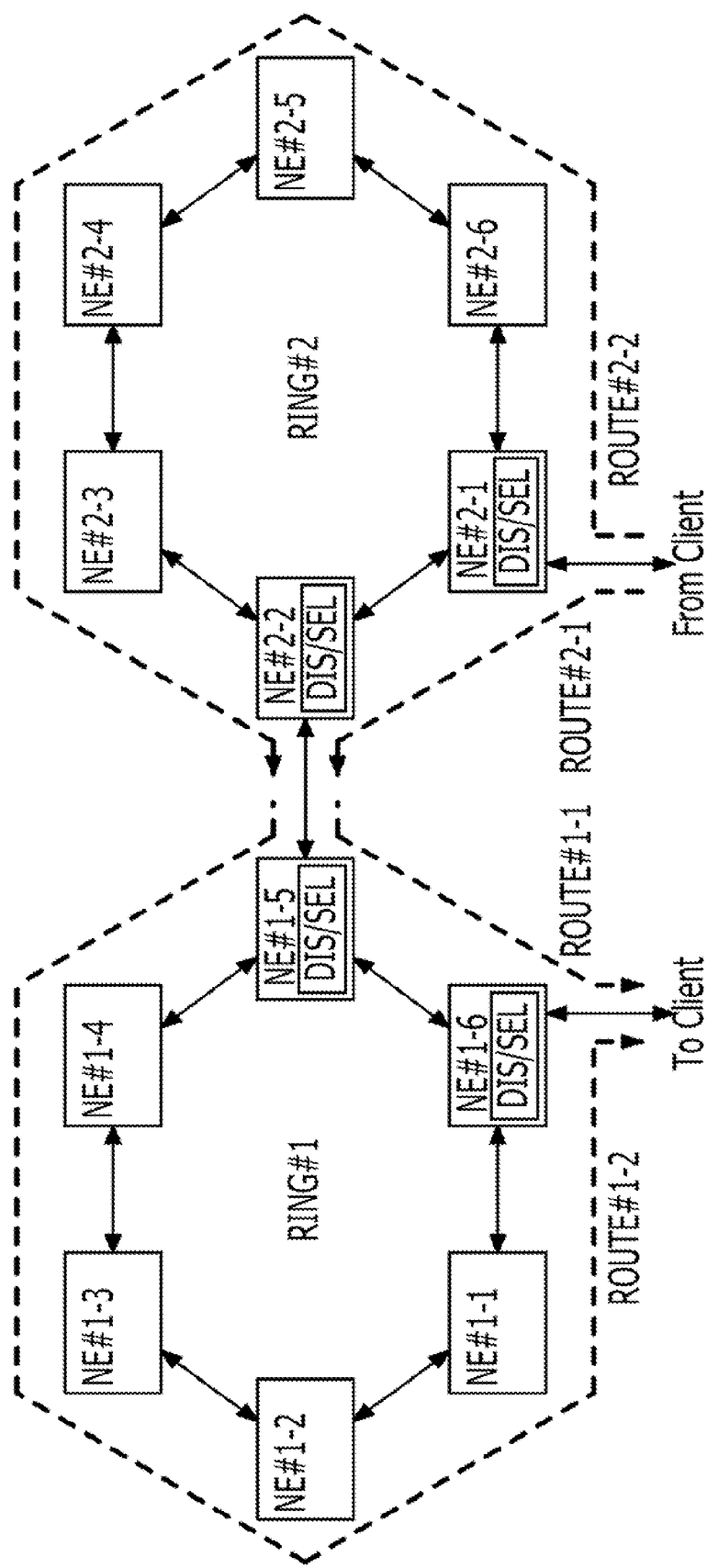
FIG. 10 is a diagram illustrating an example of a state in which SONET/SDH UPSR rings are interconnected.

FIG. 10 is a diagram illustrating an example of a state in which two SONET/SDH UPSR rings are interconnected. In this network configuration, path switch nodes in a direction in which data flows from a transmission device NE#2-1 to a transmission device NE#1-6 are the transmission device NE#1-6 in a ring RING#1 and a transmission device NE#2-2 in a ring RING#2 and hence two switch nodes are provided in the transmission line.

In the above mentioned case, a differential delay memory unit of the VCAT is included in the transmission device NE#1-6. However, even in the case that a differential delay among the paths is not relieved after adjustment has been performed for switch selection in the transmission device NE#1-6, the differential delay may be absorbed by operating the switch of the transmission device NE#2-2. In order to cope with absorption of the differential delay, a function of sending a path switch request from the transmission device NE#1-6 including the differential delay memory unit to the transmission device NE#2-2 is prepared.

Figure 11:
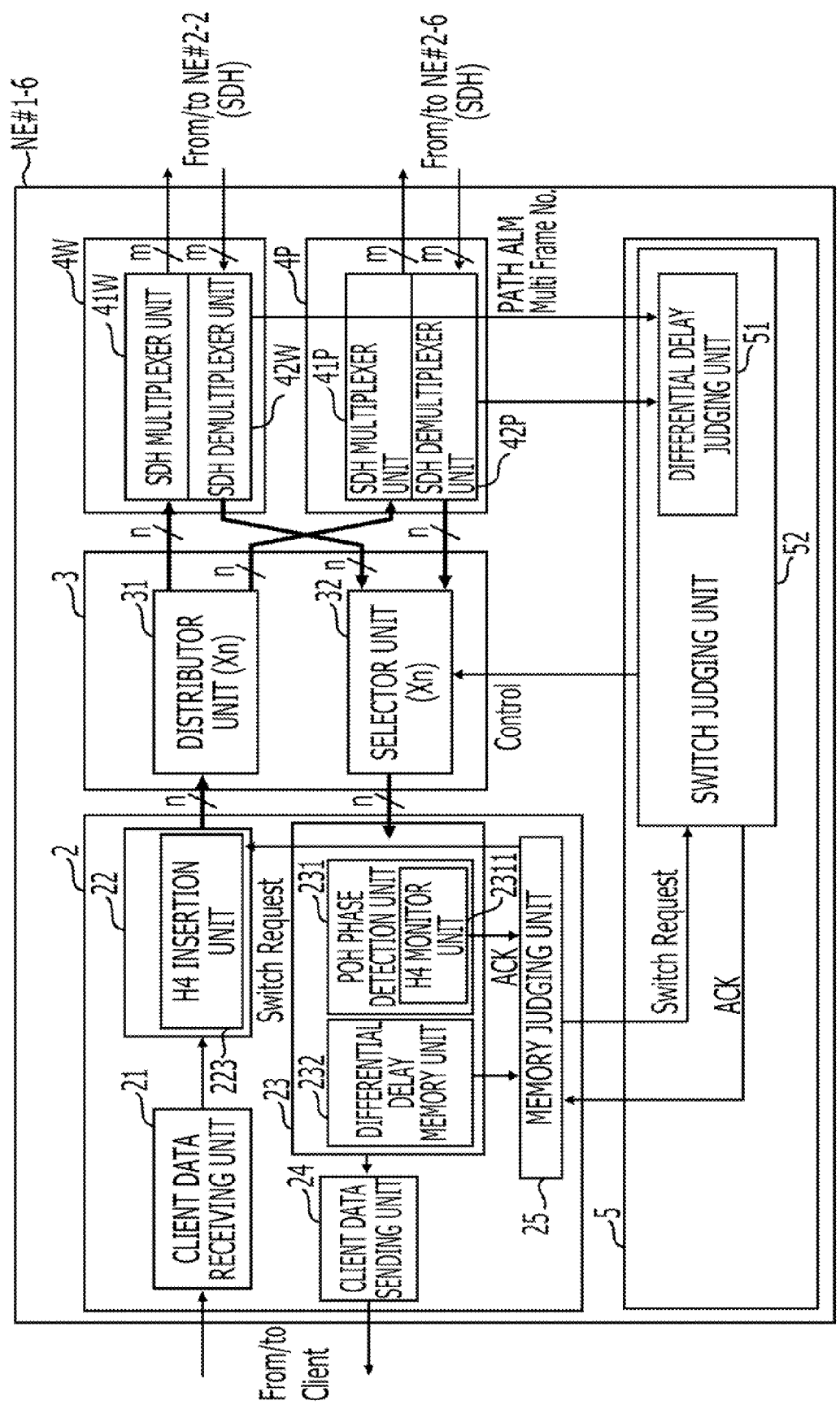
FIG. 11 is a diagram (1) illustrating an example of a configuration of a transmission device according to a fourth embodiment.

FIG. 11 is a diagram illustrating an example of a configuration of the transmission device NE#1-6 which is a client node coping with the interconnected ring configuration. The configuration illustrated in FIG. 11 differs from the basic configuration illustrated in FIG. 4 in that an H4 insertion unit 223 is included in the SDH mapping unit 22 and an H4 monitor unit 2311 is included in the POH phase detection unit 231. In addition, although there is no substantial difference in the configuration of the differential delay judging unit 51 according to this embodiment, the differential delay judging unit 51 is disposed in the switch judging unit 52 unlike the configuration in FIG. 4.

In the node according to this embodiment, in the case that overflow has occurred in the differential delay memory unit 232, first, a switch request is sent from the memory judging unit 25 to the switch control unit 5 of its own node to perform switch changing and in the case that nothing is recovered after a response (ACK) has been received, a switch request is sent to the SDH mapping unit 22.

In the SDH mapping unit 22, the H4 insertion unit 223 inserts a switch request code into the H4 Byte information to transfer the request to the ring side. At that time, a switch request flag, a delay increase/decrease flag and an ACK flag are assigned to a Reserved region (FIG. 5) of the H4 Byte information.

FIG. 12 is a diagram illustrating an example of assignment of a switch request to H4 Byte information performed so as to cope with an interconnected ring configuration.

Figure 13:
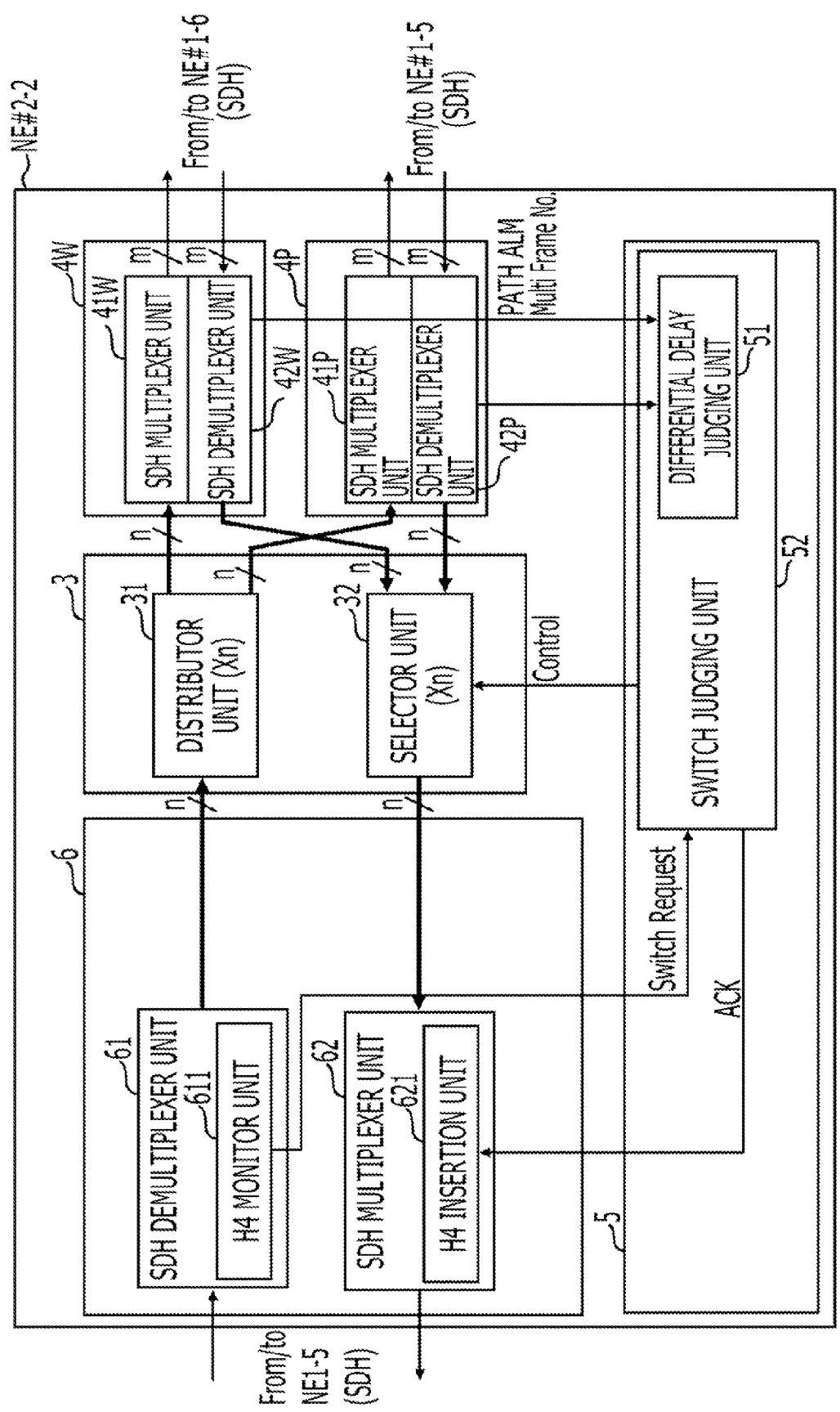
FIG. 13 is a diagram (2) illustrating an example of a transmission device according to the fourth embodiment.

FIG. 13 is a diagram illustrating an example of a configuration of the transmission device NE#2-2 configuring an interconnection node. In the interconnection node, an interface unit 6 is provided in place of the client interface unit 2. In the interface unit 6, an SDH demultiplexer unit 61 includes an H4 monitor unit 611 and an SDH multiplexer unit 62 includes an H4 insertion unit 621.

When the H4 monitor unit 611 receives a switch request from a connection destination ring, the switch request is sent to the switch control unit 5 of the interconnection node. In the switch control unit 5, as in the case in the client node, judgment about switching is performed, and when switching conforming to the switch request may be possible, switching is performed and a response (ACK) is returned to the H4 insertion unit 621. The response is inserted into the H4 Byte information using the H4 insertion unit 621 and is returned to the transmission device NE#1-6 configuring the client node.

In the transmission device NE#1-6 (FIG. 11), the H4 monitor unit 2311 of the POH phase detection unit 231 receives the response (ACK) and sends it to the memory judging unit 25.

Owing to the above mentioned configuration, a switch controlling operation which is the same as that in the client node may be performed in the interconnection node.

The fifth embodiment is described below.

Figure 14:
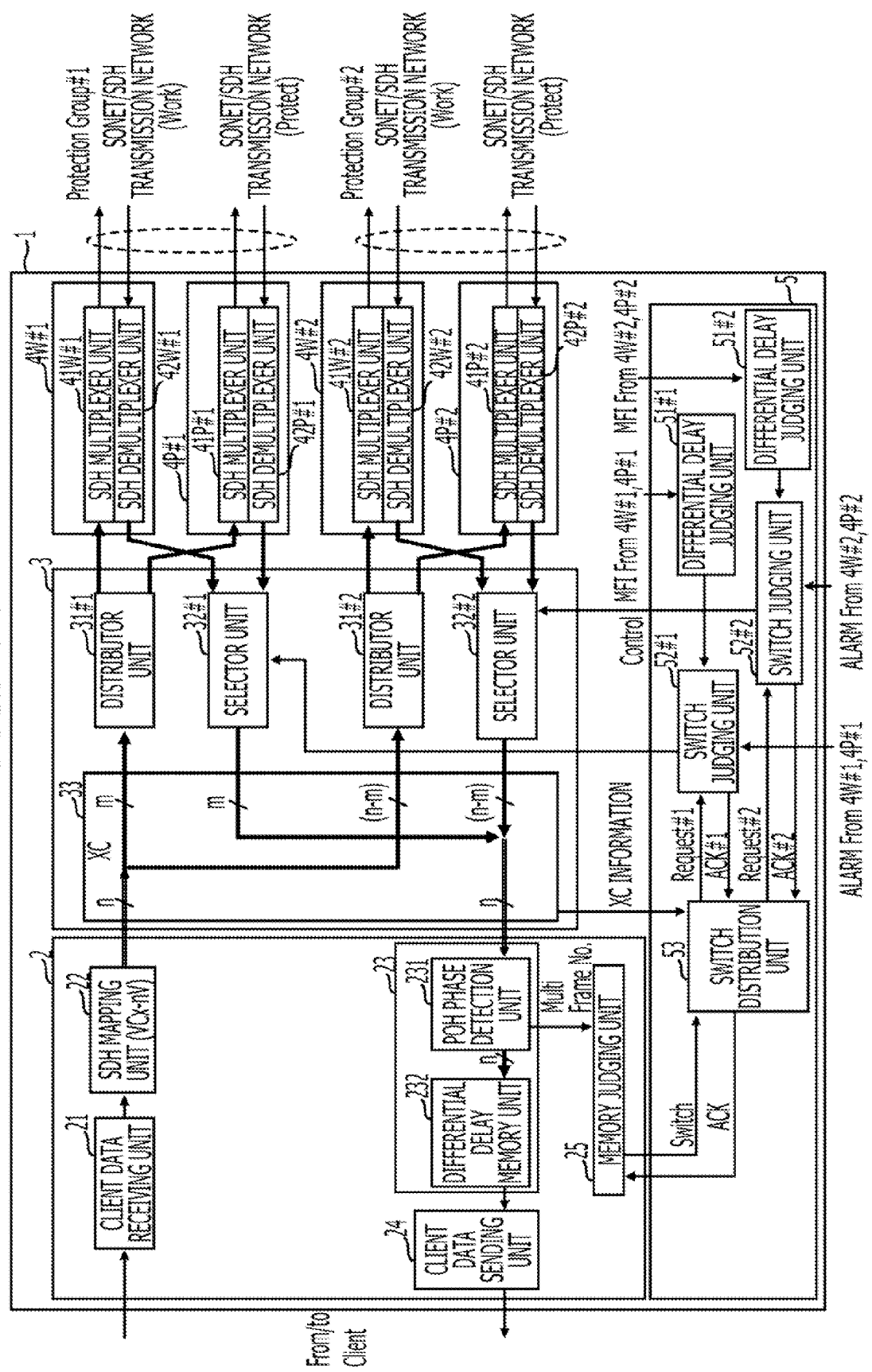
FIG. 14 is a diagram illustrating an example of a transmission device according to a fifth embodiment.

FIG. 14 is a diagram illustrating an example of a configuration of a transmission device according to a fifth embodiment. The device illustrated in FIG. 14 is configured so as to cope with line switches such as a 1+1 switch, a 1:1 switch, a BLSR (Bi-directional Line Switch) and the like.

In general, in the case that all pieces of data of a client are mapped on the interface on the same transmission network side, all the paths are typically transmitted along the same transmission line, so that any differential delay in transmission is not generated among the paths and the differential delay is not changed in accordance with the state of a line switch. However, for example, in the case that the band of the data of the client is larger than that on the side of the transmission network, it may sometimes occur that data on each path in the concatenation group is mapped on a discrete transmission-network-side interface.

FIG. 14 illustrates the example of the configuration of the device which may cope with the line switches when each piece of the client data has been mapped on the discrete transmission-network-side interface.

In the example illustrated in FIG. 14, "n" paths of the client data are divided into two groups of "m" paths and "n-m" paths using a cross connect (XC) unit 33 in the protection switch unit 3 and mapped on interface units 4W#1 and 4P#1 of a protection group #1 and on interface units 4W#2 and 4P#2 of a protection group #2 via distributor units 31#1 and 31#2. On the sink side, pieces of data of the paths which have been demultiplexed using the interface units 4W#1 and 4P#1 of the protection group #1 and the interface units 4W#2 and 4P#2 of the protection group #2 are combined with one another after passing through selector units 32#1 and 32#2.

The switch control unit 5 includes differential delay judging units 51#1 and 51#2 respectively corresponding to the protection groups #1 and #2 and performs judgment about a differential delay among the paths using the above mentioned differential delay judging units. The memory judging unit 25 in the client interface unit 2 makes a switch request with respect to a path which has been judged to be delay-adjusted on the basis of minimum/maximum delay reference judgment. In the configuration illustrated in FIG. 14, the switch request is distributed to switch judging units 52#1 and 52#2 using a switch distribution unit 53 on the basis of route selection information sent from the cross connect unit 33 to make the switch judging units operate line switches in the respective protection groups. Responses (ACK#1/ACK#2) obtained after switching are ORed using the switch distribution unit 53 and returned to the memory judging unit 25. Owing to the above mentioned configuration, adjustment of a differential delay among paths may be implemented using the line switches.

According to the above mentioned embodiments, a function of monitoring a differential delay among paths in the case that transmission data such as Ethernet-based packet data is to be transmitted using the VCAT over a hierarchical digital synchronous network such as SONET/SDH or the like and a function of controlling a protection switch in a direction in which a differential delay is decreased in the case that the differential delay memory may not absorb the differential delay any more are added.

Owing to addition of the above mentioned functions, it may become possible to configure a redundancy network by using a differential delay memory unit which is smaller in memory size than that in an existing device. This fact means that it may be possible to configure a network in which a combination of paths which is larger in differential delay may be formed using the memory of the same size as that in an existing device. Thus, even in the case that a network in which a differential delay which is larger than the initially expected one may generate is configured by addition of another network after operation, a range in which operation may be continuously performed with no data disconnection may be increased. As a result, the cost for the device may be reduced and the safety of the device may be increased. In addition, the degree of freedom in configuring a network may be increased and hence the line utilization efficiency may be expected to be increased accordingly.

The preferred embodiments have been described. Although the embodiments have been described by giving specific examples thereof, these specific examples may be modified and altered in a variety of ways without departing from the wide gist and scope defined in the patent claims. That is, it may be construed such that details of the specific examples and appended drawings do not limit the embodiments.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has (have) been described in detail, it should be understood that the various changes, substitutions, and alterations could be made hereto without departing from the spirit and scope of the invention.

What is claimed is:

1. A transmission device comprising:
   a first interface unit to receive data of a plurality of first paths which have been transmitted corresponding to a first data stream and outputting the data per path;
   a second interface unit to receive data of a plurality of second paths which have been transmitted corresponding to the first data stream and outputting the data per path;
   a switch unit to input the data which has been output from the first interface unit and the data which has been output from the second interface unit and select and output the data from the first interface unit or the data from the second interface unit per path;
   a phase detection unit to detect and output a phase difference among the paths of the data which has been output from the switch unit; and
   a control unit to control the switch unit based on the phase difference,
   wherein the control unit compares the phase difference with a threshold value, and when the phase difference is larger than the threshold value, controls the switch unit to select the data output on the paths from the plurality of first paths or the plurality of second paths so that a differential delay decreases, wherein
   correspondence of the first data stream with the plurality of first paths and correspondence of the first data stream with the plurality of second paths are made on the basis of VCAT (Virtual Concatenation), and the phase difference is detected on the basis of a position of an overhead of a data frame, the phase difference detection is one of a maximum delay reference judgment and a minimum delay reference judgment, when the phase difference is not improved based on a switching according to the one of the maximum delay reference judgment and the minimum delay reference judgment, switching according to the other of the maximum delay reference judgment and a minimum delay reference judgment is performed to decrease the differential delay.

2. The transmission device according to claim 1, further comprising:

a memory unit to store the data which has been output from the switch unit, wherein the threshold value is determined on the basis of a memory size of the memory unit.

3. A method of controlling selection of received data, comprising:

receiving data of a plurality of first paths which have been transmitted corresponding to a first data stream;

receiving data of a plurality of second paths which have been transmitted corresponding to the first data stream;

selecting the data of the plurality of first paths or the data of the plurality of second paths per path;

detecting a phase difference among the paths with respect to the data which has been selected per path;

comparing the phase difference with a threshold value; and controlling, when the phase difference is larger than the threshold value the selecting the data output on the paths from the plurality of first paths or the data of the plurality of second paths so that a differential delay decreases, wherein correspondence of the first data stream with the plurality of first paths and correspondence of the first data stream with the plurality of second paths are made on the basis of VCAT (Virtual Concatenation), and the phase difference is detected on the basis of a position of an overhead of a data frame, the phase difference detection is one of a maximum delay reference judgment and a minimum delay reference judgment, when the phase difference is not improved based on a switching according to the one of the maximum delay reference judgment and the minimum delay reference judgment, switching according to the other of the maximum delay reference judgment and a minimum delay reference judgment is performed to decrease the differential delay.

4. The method according to claim 3, further comprising:

storing the data, wherein the threshold value is determined based on a memory size of a memory unit.

* * * * *